Figure 1:
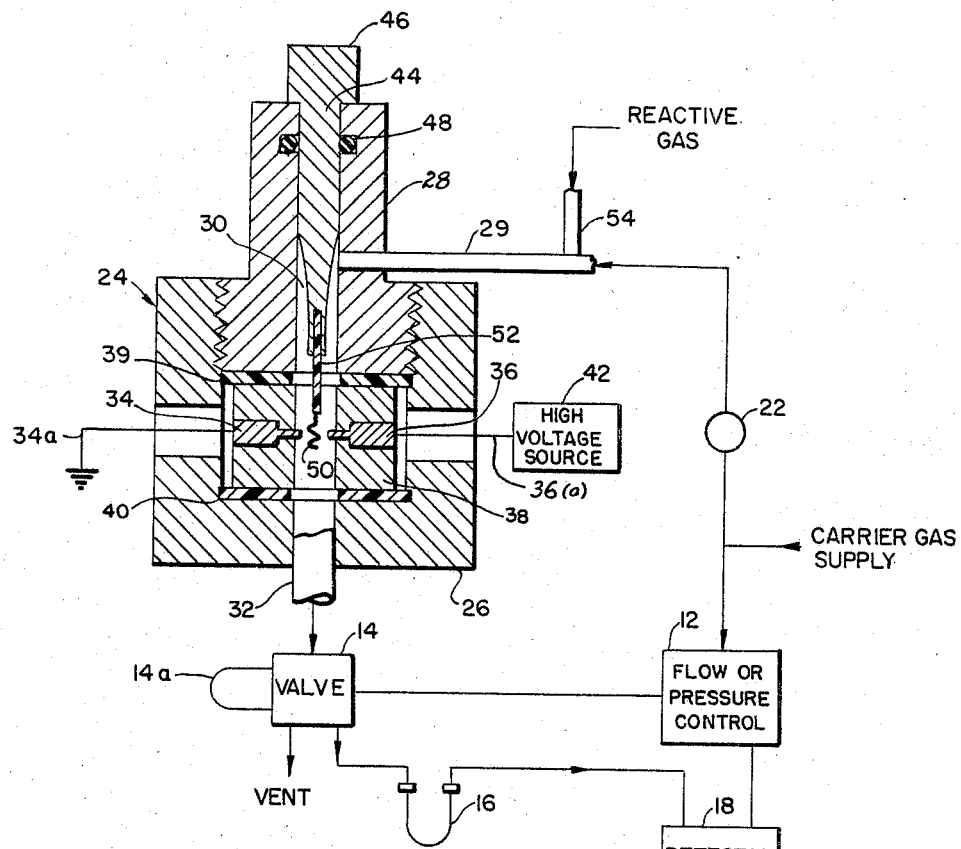

May 30, 1967

J. C. STERNBERG 3,322,500

FRAGMENTATION APPARATUS FOR CHARACTERIZATION
OF SAMPLE COMPOSITIONS

Filed Feb. 27, 1964

2 Sheets-Sheet 1

INVENTOR.
JAMES C. STERNBERG
BY
*Gerd L. Medlhoff*
ATTORNEY

May 30, 1967 J. C. STERNBERG 3,322,500
FRAGMENTATION APPARATUS FOR CHARACTERIZATION
OF SAMPLE COMPOSITIONS
Filed Feb. 27, 1964 2 Sheets-Sheet 2

INVENTOR.
JAMES C. STERNBERG
BY
ATTORNEY

United States Patent Office 3,322,500
Patented May 30, 1967

3,322,500
FRAGMENTATION APPARATUS FOR CHARACTERIZATION OF SAMPLE COMPOSITIONS
James C. Sternberg, Fullerton, Calif., assignor to Beckman Instruments, Inc., a corporation of California
Filed Feb. 27, 1964, Ser. No. 347,744
19 Claims. (Cl. 23—253)

The present invention relates to an apparatus for characterization of an organic sample composition by fragmentation of the sample into volatile products and subsequent identification of the sample through the breakdown pattern of these products obtained in chromatograph apparatus.

In chromatographic analysis, a sample of gas or fluid mixture is introduced into a gas or fluid carrier stream and carried by the stream through a separation column. The separation column is normally a tubular conduit packed with a material for which each of the respective components of the mixture has its own unique "affinity" or retention time. The difference in the "affinity" or retention time of the respective components of the mixture causes the different components of the sample to stay within the column for different lengths of time. Therefore, the components of the mixture emerge from the column at different times.

As each component emerges from the column, it is normally passed through a detector device which measures a physical property of the respective component generally referenced against the value of the same property for the carrier fluid. The detector emits a signal that is representative of the percentage or quantity of the particular component within the sample. A recording of the output of the detector for a particular gaseous or liquid sample results in a multipeaked curve, wherein each peak may represent one component of the sample. The quantity of each of the components is represented by the area under its respective portion of the curve and may be calculated by integration or, in some cases, may be estimated from the peak height.

Gas chromatography provides a new and useful technique for separation and analysis of mixtures of volatile components and is particularly applicable where the components of the sample mixture are known and where it is desirable to obtain quantitative information regarding the components of the mixture. However, if the sample or the composition thereof is unknown, identification of the particular sample or composition through gas chromatographic analysis is sometimes difficult and laborious. The principal means for obtaining qualitative information from separations on a gas chromatograph, where the sample or a number of components of a mixture are unknown, has been based on a comparison of the retention time or retention volume of the unknown component or unknown components to that of a known component or components run under identical conditions. This method of analysis has its limitations and many additional and varied schemes have been proposed to provide further qualitative information concerning the nature of or identity of a sample component.

One method for qualitative identification of a sample or a component of a sample involves coupling the gas chromatograph to a time of flight mass spectrometer, where the sample is ionized and analyzed into a mass spectrum from which the components are then identified. Still another method for identification of the sample or its constituents employs functional group classification reagents which are used in conjunction with retention volume data obtained from a corresponding chromatogram to provide positive identification characteristics of a particular component due to its reaction characteristics with the reagent.

The above-mentioned analysis methods are either extremely time consuming or involve the use of other and extremely expensive analysis instrumentation in combination with the gas chromatograph apparatus. It would be much more desirable and convenient to be able to obtain qualitative information concerning unknown components entirely with the use of chromatographic techniques.

It is, therefore, an object of the present invention to provide a new and improved apparatus which lends itself to characterization of an unknown sample and utilizing only gas chromatographic techniques for qualitative identification purposes.

It is another object of the present invention to provide an improved apparatus for breaking down a sample into fragmentation products for identification of the sample through the chromatograph pattern of the fragmentation products.

It is a further object of the present invention to provide an improved sample volatilization device for use in volatilizing and fragmentation of a sample to be analyzed in a gas chromatograph apparatus.

Further objects and advantages of the invention will become apparent as the following description proceeds and the features of novelty which characterize the invention will be pointed out with particularity in the claims annexed to and forming a part of this specification.

Briefly, the invention comprises apparatus for fragmenting at least a representative portion of a sample by introducing it into an electrical discharge and thereafter separating the breakdown products, produced by the electrical discharge, in a chromatographic column system, thereby to obtain a fragmentation pattern which is highly characteristic of the sample molecular structure.

Figure 2:
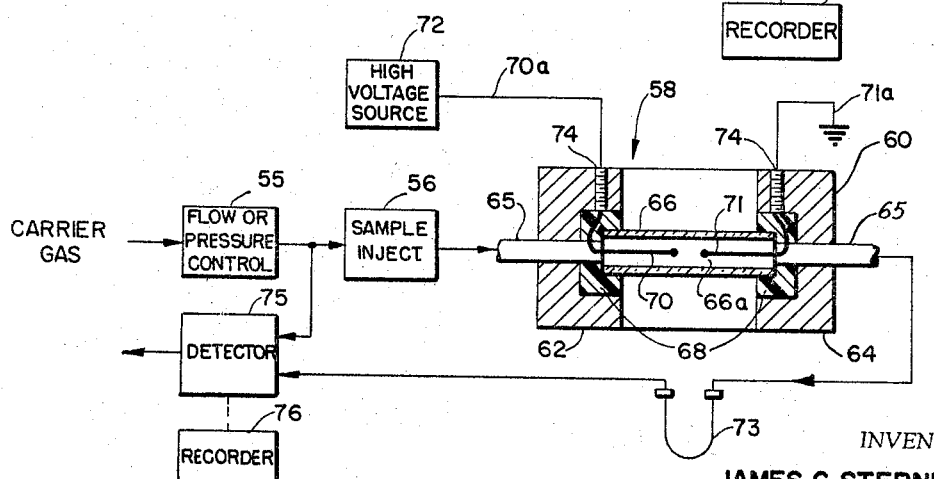
Figure 3:
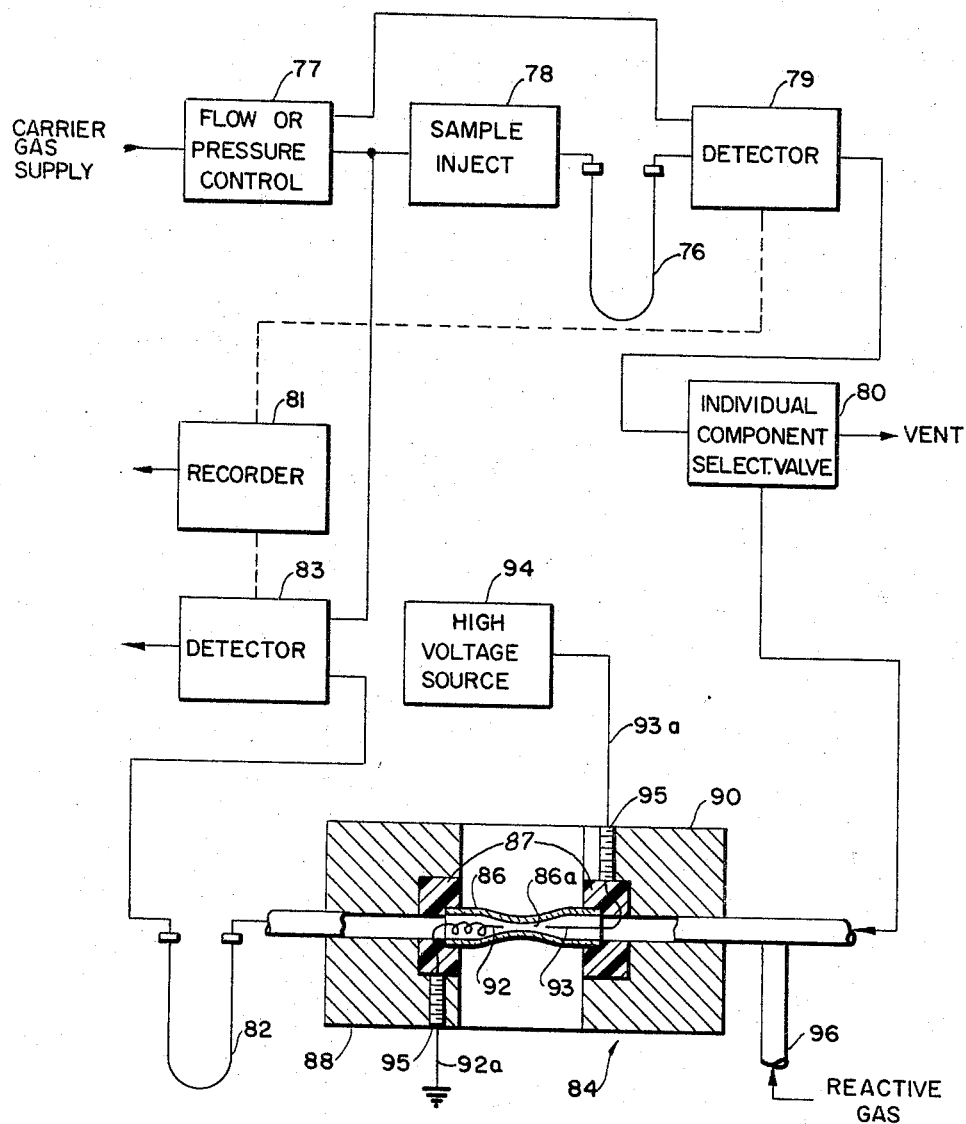

For a better understanding of the invention, reference may be had to the accompanying drawings in which:

FIG. 1 is a schematic line diagram representation of the apparatus according to one embodiment of the invention;
FIG. 2 is a schematic line diagram illustrating another embodiment of the invention; and
FIG. 3 is a diagrammatic representation of a third embodiment of the invention.

Referring now to the drawing, FIG. 1 represents a gas chromatograph system and fragmentation device for volatilizing a sample component into a number of its volatile breakdown products for identification in the gas chromatograph apparatus. The chromatograph system includes a pressure regulator or flow controller 12, a sample switching or component selector valve 14, a chromatograph column or system of columns 16, a detector 18 and a recorder 20. The flow of carrier gas, ordinarily helium, although other gases such as argon, nitrogen, carbon dioxide, hydrogen and even air may be used, is controlled by the pressure regulator 12. At a particular time, a quantity of sample, which has previously been volatilized, is injected into the carrier stream by means of the sample injector valve 14. The sample fragments or breakdown products, injected into the system, are separated as the sample moves through the column system 16. The detector 18 provides an output indication of the presence of the individual sample fragments in the effluent emerging from the column 16.

The output of the detector may be used as a quantitative measure of the components of the sample. In actual practice, the output of the detector is ordinarily recorded by a recorder instrument, designated by reference numeral 20, for subsequent review, although the output may merely be indicated for contemporaneous visual inspection on a meter or other device.

It should be understood that the column 16, shown in FIG. 1, represents a system of columns necessary for a complete or partial separation of the fragmentation components of any particular unknown sample. The column system may comprise a plurality of columns arranged in series or parallel depending upon the requirements of the type of sample being analyzed.

As will be hereinafter explained, the present invention contemplates full characterization and identification of the products of a sample regardless of whether it is solid or fluid. In FIG. 1 there is disclosed an electrical discharge device or means 24 for quickly volatilizing and breaking down products from a solid or liquid sample for characterizing in the gas chromatograph apparatus. In the preferred embodiment illustrated in FIG. 1, carrier gas flows through a valve or other flow restrictor 22 into an electrical discharge device or apparatus 24. It should be understood that this gas stream may be supplied from a separate source and may actually be a different gas than that used in chromatograph apparatus as a carrier gas. Flow of gas is introduced into a longitudinal civity or channel 30 of the apparatus through a conduit 29 connecting with the apparatus. In the illustrated embodiment of FIG. 1, conduit 29 is attached by any suitable coupling arrangement to the upstanding neck 28 of the discharge apparatus. The main body or housing 26 of the discharge apparatus is formed of a block of brass or other suitable structural material and the upwardly extending neck portion 28 is threaded into the upper section of the housing. Carrier gas flows into the channel 30 through the neck 28 and flows through the apparatus to be discharged into a tube or conduit tube 32 leading to the sample inject or component selector valve 14.

Means are provided within the housing 26 for producing an electrical discharge within the cavity 30 and the gas stream flowing therethrough. In the illustrated embodiment of the invention, these means comprise a pair of electrodes 34 and 36 which are supported within the housing 26 by an insulated support bushing 38 also forming a part of the longitudinal cavity 30. It will be understood that the electrodes could be supported by the housing 26 itself, which could be suitably insulated from the other components of the system. The support bushing may be formed of any electrically and thermally nonconductive material such as steatite or alumina and, in the illustration shown, is further insulated from the housing 26 by means of a pair of upper and lower insulation gaskets 39 and 40. The ends of the electrodes 34 and 36 are, in this embodiment of the invention, spaced across the channel or cavity 30 within the support member 38. One of the electrodes 34 is connected by suitable conducting means 34a to ground and the other electrode 36 is connected by a suitable conductor 36a to a source of high voltage 42. The high voltage source 42 must be of sufficient capacity to provide a voltage across the electrodes 34 and 36 to create an electrical discharge in the carrier gas stream flowing under a pressure desired for operation of the device. For example, when helium is used as a carrier gas at atmospheric pressure and a gap of one centimeter is provided between the ends of the electrodes 34 and 36, an electrical glow discharge across the electrodes of sufficient energy to break down and volatilize a sample of polystyrene was created by a voltage of 500 to 600 volts at a current of 50 milliamperes for a time interval of 10 seconds. These values are seen to fall clearly within the well-known glow discharge range.

In order to introduce the sample into the discharge between the electrodes, there is provided a sample insertion probe 44, having a handle or knob 46 on the upper end thereof to permit removal and replacement of the probe into the apparatus. The probe extends downwardly through the channel or cavity 30 also formed through the neck 28 of the apparatus and an O ring 48 positioned in a seat formed in the upper portion of the neck 28 provides a suitable seal around the probe 44 to prevent flow of carrier gas through the upper end of the apparatus when the probe is in place. On one end of the probe there is provided a sample holder 50 in the form of a loop, spiral or wire basket, which is capable of supporting a liquid or solid sample as the probe is inserted into the electrical discharge apparatus. The sample holder 50 is attached to the probe through an insulated arm or section 52 which thermally and electrically insulates the sample holder 50 from the rest of the probe. The length of the probe is such as to place the sample holder 50 between the electrodes 34 and 36 and within the electrical discharge.

The sample is inserted in solid or liquid form and subjected to the discharge across the channel to be quickly volatilized. When a molecular species containing rupturable bonds is introduced into this electrical discharge, substantial decomposition can occur, leading to new molecular species formed from the fragments of the original compound. The extent of fragmentation is dependent upon the energy of the electron stream, the current passed between the electrodes and the nature and concentration of the sample species. In the electrical discharge, the high electron energies produce fragmentation equivalent to that obtained by heating a sample to very high temperature, but without necessitating the raising of significant masses to this temperature. Under controlled conditions, the pattern of fragments produced can provide a fingerprint-like characterization of the original sample species. It will be noted that the carrier gas flows around the probe in the upper neck of the apparatus and flows through the cavity or channel 30 to sweep the fragmented products of the discharge from the probe into the lower portion of the channel 30 connecting with the conduit 32 leading to injection valve 14. Valve 14 injects the fragmented sample in the chromatograph system and chromatograph column 16 separates the individual fragmentation products formed in the discharge. These separated fragmentation products are passed through the detector to give a chromatograph pattern that can be used to characterize the original sample species.

As will be noted, the arrangement of FIG. 1 includes the component selector valve 14 having a sample cavity or loop 14a into which the sample components flow. At a suitable time a certain volume or slug of the effluent flowing through the line 32 from the electrical discharge device 24 may be selectively switched by means of the valve 14 into the column system 16 and forced therethrough by the flow of carrier gas. While the preferred embodiment of FIG. 1 utilizes a vented injection valve 14 in the line leading to the chromatograph column 16, it will be obvious that the fragmented products could be directly injected into the column 16 after they are volatilized in the discharge device. However, the use of the component selector valve permits the selection of a particular volume or slug of the volatile constituents flowing through the valve as well as facilitating more uniform sampling of the sample products. The use of a component selector valve 14 has several other advantages in apparatus of this type. For example, it permits the use of extremely low flow rates for the carrier gas flowing through the vaporization and fragmentation chamber as compared to the flow rate of carrier gas through the gas chromatograph apparatus. Through use of the low flow rates and selector valve 14, the fragmentation products can be confined to the relatively small volume of carrier gas flowing during the time required for vaporization and fragmentation, so that the resultant chromatographic peaks will be sharper and better resolved.

In order to employ this apparatus for qualitative identification of a sample, it is essential that the discharge in the sample volatilization or discharge apparatus 24 be carried out under conditions which produce, for any particular sample, a breakdown pattern that has a high level of reproducibility, that is relatively independent of sample size, and which retains as much as possible the characteristic structural features of the parent molecule.

It has been found in a tested embodiment of the invention that, when some samples are introduced into the discharge in an inert carrier gas, such as helium, the presence of the sample itself sometimes greatly alters the characteristics of the electrical discharge over that occurring in the carrier gas stream alone so that the breakdown voltage, current, and average electron energy change drastically, dependent upon the particular sample and its concentration. It has been observed that the breakdown or sample fragments (free radicals) initially formed during the fragmentation operation tend to undergo subsequent reactions with one another, and with the unreacted parent compound (which is volatilized), greatly complicating the breakdown product pattern, thereby making it more concentration dependent and less characteristic of the structural features of the parent compound.

In order to overcome the above disadvantages which occur with certain samples and to make the electrical discharge much more stable, it has been found desirable in the preferred embodiment of the invention, to introduce a reactive gas component over the electrical discharge during vaporization and fragmentation of the sample. A reactive gas, such as hydrogen, may be inserted into the gas stream flowing through the central channel 30 at some point prior to the region of the electrical discharge. The added reactive gas component may be inserted into the instrument of FIG. 1 through a conduit 54, attached to the conduit 29 as illustrated. Or the reactive gas may be introduced by means of a separate inlet leading into the central chamber 30. If hydrogen, or other reactive gas components are used as the carrier stream through the apparatus, instead of an inert gas such as helium, it is, of course, unnecessary to add a reactive gas component. However, a continuous flow of reactive gas component as the carrier gas stream is in most cases believed undesirable because of the effects the reactive gas component may have on the chromatographic column and detector. In particular, an added reactive gas may produce a carrier gas composition which will not allow operation of a detector in its most favorable and sensitive manner. Also, any fluctuations in the rate of introduction of the reactive gas into the carrier will produce fluctuations in the composition of the carrier gas stream when it reaches the detector 18, and these fluctuations can lead to detector signals which can be confused with or may obscure true chromatographic peaks originating within the sample.

The above characteristics of a reactive gas further illustrate the advantage of using a vented component selector valve 14 for introducing the volatilized and fragmented sample into the carrier stream flowing through the chromatograph apparatus.

The use of valve 14 permits flow of the reactive component gas through the vaporization and fragmentation chamber with contaminating the carrier stream flowing through the chromatograph apparatus with such reactive gas. The sample loop 14a, is at all times (except in the sample inject position) vented or removed from the carrier stream flowing through the gas chromatograph apparatus. Thus, the reactive gas component does not enter the chromatograph apparatus except for the small quantities thereof inserted during sample injection. Reactive gases, other than hydrogen which may be used are carbon dioxide, the halogens, hydrogen halides, nitrogen, nitric oxide or nitrous oxide. The selection of any particular reactive gas would be largely based upon the particular type of sample being analyzed and the reactions desirable with the sample.

The added reactive component behaves as a moderator of the discharge process in several ways. Electrically, the presence of a large amount of a diatomic molecule, such as hydrogen, or a polyatomic molecule such as nitrous oxide, tends to alter the discharge in a manner which makes it virtually oblivious to any reasonable concentration of the sample. The average electron energy and the energy distribution are largely controlled by the concentration of the hydrogen present since the very probably collisions between electrons and hydrogen absorb energy for the vibrational, rotational and electronic excitation and the dissociation of hydrogen. This virtually eliminates electrons of energies greater than perhaps 10 e.v., thus moderating the energies of the discharge reactions. The addition of amounts of sample vapors in concentrations small compared to the concentration of the hydrogen will produce only negligible further changes in the electron population and energy distribution.

Another important moderation produced by the reactive component, such as hydrogen, is the moderation of the chemical processes which occur. The addition of hydrogen during the analysis of a sample of organic composition virtually assures nearly immediate reaction with hydrogen of the free radical fragments initially created, thus readily forming stable fragmentation products without allowing significant interactions of the free radical fragments among themselves or with the parent (sample) compound.

Referring now to FIG. 2, there is shown a second embodiment of the invention, wherein a sample is first violatilized and injected into the system at some point upstream from an electrical discharge means and is then conducted by the carrier stream into the region of the electrical discharge. More specifically, carrier gas, such as helium, is introduced into the system and flows through a flow or pressure controller 55 and thence through a region in which the sample is injected. The sample injection device 56 may comprise a sample injection valve or merely a syringe injection inlet of the type commonly used in the gas chromatograph field. The sample volatilizes prior to injection or at the point of injection and mixes with the inert carrier gas to be carried into the fragmentation or electrical discharge device 58.

In the fragmentation device 58, disclosed in FIG. 2, there is provided a support member or structure 60 made of metal or other suitable material which has attached to its opposite sections 62 and 64, inlet and outlet conduits 65 leading to the remaining portions of the system. Supported between the opposite end sections 62 and 64 of the structure is a fragmentation channel or chamber 66a formed by an electrically and thermally insulating enclosure member 66. The member 66 is supported in end sections 62 and 64 by means of support bushings 68 of polytetrafluoroethylene or other suitable insulation material which extend into cavities formed in the opposite end sections of the housing. Preferably the fragmentation channel enclosure member 66 is made from a tubular section of fused silica, alumina, glass, or other nonconductive and thermally stable material. The housing or support structure is preferably designed so that the enclosure member 66 may be removed for cleaning or replacement. Within the fragmentation chamber 66a are provided a pair of electrode members 70 and 71 spaced a short distance within the interior of the chamber 66a and connected respectively through electrical conductors 70a and 71a to a high voltage source 72 and to ground. Suitably insulated lead-in terminals 74 conduct the high voltage current to the respective electrodes 70 and 71 and insulate the end sections 62 and 64 from the electrodes. It will also be noted that the insulated bushings 68 also effectively separate the tubing or conduits 65 from the electrodes 70 and 71 thereby electrically isolating these electrodes from the remaining portions of the system and assuring that there will be no electrical discharge occurring between the tubing and respective electrodes.

In the embodiment disclosed in FIG. 2, the sample is swept by carrier gas into the electrical discharge produced between electrodes 70 and 71 and is subjected to the breakdown forces of the discharge. The sample is broken into its fragmentation products within the chamber and swept from the chamber directly into the column system 73 where these breakdown products are separated. Since, in this embodiment, the sample originally enters as a narrow pulse of sample in carrier gas, it is not necessary here to use a sampling valve corresponding to the valve 14 of the embodiment of FIG. 1. The separation pattern is identified as the fragments flow through the detector 75. As in the arrangement of FIG. 1, a recorder 76 may be used for recording the breakdown pattern of the sample fragments in order to provide a record of the fragmentation pattern for identification purposes.

As in the arrangement shown in FIG. 1, the column 73 is merely representative of a gas chromatograph column system necessary for separation of the suspected breakdown products. The system may comprise a plurality of columns connected either in series or parallel, or a combination of series parallel columns. While there is not shown, in the illustrated embodiment of FIG. 2, any means for introducing a reactive gas component into the electrical discharge, it will be understood that such a reactive gas inlet can and preferably is provided for the same purposes as set forth with respect to the arrangement of FIG. 1, merely by connecting a suitable source of reactive component gas to the inlet tubing connecting with the apparatus. In such a case it would be desirable to use a vented component selector valve, such as valve 14 of FIG. 1, in the outlet line leading from the fragmentation apparatus 58, in order to eliminate the flow of reactive gas into the chromatograph apparatus.

The glass or discharge enclosure member 66 may be easily replaced, in this embodiment of the invention, merely by separating the two end sections 62 and 64 of the structure and removing the glass member. The contacts or electrodes 70 and 71 which are removed from the chamber with the end sections are then inserted into a new glass member 66 and the apparatus is purged and thus prepared for a new sample. It should be understood that other structural arrangements embodying these features are acceptable. Thus, metal electrodes sealed through glass, silica, or ceramic material would eliminate some of the superstructure shown in FIG. 2.

Referring now to FIG. 3, there is shown a more sophisticated gas chromatograph apparatus for identifying a sample species using a fragmentation technique to derive qualitative information regarding the sample species. As may be seen in FIG. 3, the system includes a carrier gas supply, the flow of which is controlled by a flow or pressure controller 77. A sample inject means 78 is provided for volatilizing and injecting a sample mixture or component into the system at some point ahead of a first gas chromatograph column 76 or system of columns, designed to separate the individual constituents of the sample mixture. First column system 76 may comprise any number of columns arranged in parallel or series for producing a suitable separation of the constituents or components of the sample mixture.

The separated components or constituents enter the detector 79 which produces a representative signal indicative of the particular characteristic of the sample component flowing therethrough. This characteristic may be recorded for reference on a recorder, such as the recorder 81. As each constituent or component emerges from the detector 79, it enters a component selector valve 80 which is operated to pass the separated components into a fragmentation apparatus and chromatograph system for characterization of the particular sample constituent. The component selector valve 80 may be energized to select a particular sample component by means of a signal taken from the detector 79 or may be manually or automatically energized by other means, such as a programming apparatus. It should be mentioned that the component selector valve 80 may be so constructed and arranged as to inject the selected components, emerging from the first column system 76, into a series of traps, such as refrigerated trapping columns, which may be used to store the respective components so that they may be individually released and fragmented when desired.

The selected sample constituent or component is then introduced into a fragmentation or electrical discharge apparatus 84 designed to subject the separated sample constituent to an electrical discharge for the purpose of fragmenting the sample constituent into its fragmentation products, which are then analyzed in a chromatographic apparatus substantially as described with respect to the arrangements disclosed above. More specifically, the sample constituent flows through the fragmentation apparatus 84 and is subjected to an electrical discharge. The breakdown products are then passed into the second chromatograph column or second system of columns 82 and separated. As in the previous embodiments of the invention, second column 82 is representative of a single column or number of columns necessary to separate a particular type of sample species to be analyzed. The fragmentation products emerging from the chromatograph column 82 enter a detector or multiple detectors 83, which provides signals representative of the particular chromatographic pattern of the fragmentation products. These signals may also be recorded on one or several recorders 81 in order to further provide a permanent identification of the particular fragmentation pattern.

In the embodiment shown in FIG. 3, there is shown a slightly modified version of the electrical discharge apparatus 84. As in the embodiment of FIG. 2, there is provided a flow through channel or cavity 86a formed in a nonconductive, chemically inert, thermally stable tubular member 86 which is supported in the end sections 88 and 90. End sections 88 and 90 are, in turn, attached respectively to the conduits communicating with the other components of the system. In order to more uniformly subject the sample to the electrical discharge and to attain a greater uniformity of breakdown products, the fragmentation chamber is provided with a restricted passage or venturi-shaped restriction in the region of the electrical discharge within the chamber 86a. By restricting the discharge portion of the chamber, a substantially greater percentage of the sample is forced to flow directly through the electrical discharge, thereby more completely and more uniformly encouraging the breakdown pattern of the particular sample constituent. By using a restricted flow path the same discharge current can be employed and subjects a greater portion of the sample to somewhat less extensive fragmentation rather than of subjecting a small portion of the sample to more extensive breakdown.

As in the previous embodiments of the invention, the glass or nonconductive cavity member 86 is supported in a pair of bushings 87 formed of suitable electrical and thermal insulation material, such as polytetrafluoroethylene. Electrode members 92 and 93 are positioned on opposite ends of the restricted passage in order to create an electrical discharge within the restricted passage. These electrodes are connected respectively through conductors 92a and 93a to ground and to a source of high voltage 94. Lead in terminals 95 insulate the end sections 88 and 90 from the high electrical power input. Obviously, only the high voltage end of the chamber 86a need be insulated insamuch as the tubing of the chromatograph apparatus may be grounded.

In order to promote better conditions for a stable electrical discharge, a reactive gas such as hydrogen is introduced into the gas stream through a conduit 96, which may connect as illustrated, to the conduit introducing the carrier gas stream and sample component through channel or chamber 86a at a point upstream from the electrical discharge. As previously discussed with respect to the arrangement of FIG. 1, the reactive gas serves to moderate the discharge processes and to stabilize the discharge conditions.

Depending upon the stability of the electrical discharge, the particular configuration of the discharge chamber, and the voltage and current applied to the electrodes, a certain percentage of the total sample is broken down into fragmentation products as it flows through the discharge. By maintaining these conditions in the discharge chamber uniform from sample to sample, the breakdown products formed for any particular sample or species are consistently reproducible and can be used to provide a chromatographic pattern with sufficient reproducibility to easily identify the parent molecule. While this arrangement is particularly applicable to the characterization of hydrocarbons and other organic component samples, it should not be considered as limited thereto. The apparatus readily lends itself to the volatilization of other types of sample products which may be separated in a chromatograph system.

While in accordance with the patent statutes there has been shown and described what at present is considered to be the preferred embodiment of this invention, it will be obvious to those skilled in the art that various changes and modifications may be made therein without departing from the invention, and it is, therefore, the intent of the appended claims to cover all such changes and modifications as fall within the true spirit and scope of the invention.

What is claimed is:

1. In an apparatus for characterization of a sample, the combination comprising:
   means forming a cavity having inlet and outlet openings;
   means connected to said inlet and outlet openings for flowing a stream of carrier fluid through said cavity;
   means for introducing an organic sample into said cavity;
   means for creating an electrical glow discharge in said cavity for fragmenting at least a portion of said sample into a plurality of individual volatile fragmentation products at least some of which retain characteristic structural features of the parent molecule of said sample;
   at least one chromatograph column for separating components of a mixture passed therethrough;
   means for passing a stream of carrier fluid through said column;
   means for introducing said volatile fragmentation products from said electrical discharge into said stream of carrier fluid flowing through said chromatograph column for separating said individual fragmentation products; and
   a detector for identifying and measuring individual fragmentation products as they emerge from said column.

2. In an apparatus for characterization of a sample, the combination comprising:
   means forming a cavity having inlet and outlet openings for the flow of a carrier fluid;
   means for flowing a stream of carrier fluid through said cavity;
   support means supporting spaced-apart electrode members within said cavity;
   means for introducing an organic sample into said cavity between said electrodes;
   means applying an electrical potential across said electrodes of sufficient intensity to create an electrical glow discharge for fragmenting at least a portion of said sample into a plurality of individual volatile fragmentation products at least some of which retain characteristic structural features of the parent molecule of said sample;
   at least one chromatograph column for separating components of the mixture passed therethrough;
   means for passing a stream of carrier fluid through said column;
   means for introducing said volatile fragmentation products from said cavity into said stream of carrier fluid flowing through said chromatograph column for separating said individual fragmentation products; and
   a detector for identifying and measuring individual fragmentation products as they emerge from said column.

3. In an apparatus for characterization of a sample, the combination comprising:
   non-conductive means defining a cavity having inlet and outlet openings;
   means connected to said inlet and outlet openings for flowing a stream of carrier fluid through said cavity;
   means for introducing an organic sample into said cavity;
   a pair of spaced-apart electrode means mounted within said cavity for fragmenting at least a portion of said sample into a plurality of individual volatile fragmentation products at least some of which retain characteristic structural features of the parent molecule of said sample; said electrodes being connected to a high voltage source for producing a glow discharge across the said electrode means to effect the said fragmenting;
   at least one chromatograph column for separating components of the mixture passed therethrough;
   means for passing a stream of carrier fluid through said column;
   means for introducing said volatile fragmentation products from said cavity into said stream of carrier fluid flowing through said chromatograph column for separating said individual fragmentation products; and
   a detector for identifying and measuring individual fragmentation products as they emerge from said column.

4. In an apparatus for characterization of a sample, the combination comprising:
   means forming a cavity having inlet and outlet openings;
   means mounted in said inlet and outlet openings for flowing a stream of carrier fluid through said cavity;
   means for introducing a sample into said cavity;
   means for creating an electrical discharge in said cavity for fragmenting at least a portion of said sample into a plurality of individual volatile fragmentation products at least some of which retain characteristic structural features of the parent molecule of said sample;
   means for introducing a flow of reactive gas component through said electrical discharge for stabilizing said electrical discharge and reacting with fragmentation products produced therein as said sample is introduced into said electrical discharge;
   at least one chromatograph column for separating components of a mixture passed therethrough;
   means for passing a stream of carrier fluid through said column;
   means for passing a stream of carrier fluid through said column;
   means for introducing said volatile fragmentation products from said cavity into said stream of carrier fluid flowing through said chromatograph column for separating said individual fragmentation products; and
   a detector for identifying and measuring individual fragmentation products as they emerge from said column.

5. In an apparatus for characterization of a sample, the combination comprising:
   means forming a cavity having inlet and outlet openings;
   means for introducing a sample into said cavity;
   means for creating an electrical discharge in said cavity for fragmenting at least a portion of said sample into a plurality of individual volatile fragmentation products at least some of which retain characteristic structural features of the parent molecule of said sample;

means for introducing a reactive gas component at a point upstream from said electrical discharge for stabilizing said electrical discharge and reacting with individual volatile fragmentation products as said sample is introduced into said cavity;

at least one chromatograph column for separating components of a mixture passed therethrough;

means for passing a stream of carrier gas through said column;

means for introducing said volatile fragmentation products formed in said electrical discharge into said stream of carrier gas flowing through said chromatograph column for separating said individual fragmentation products; and a detector for identifying and measuring individual fragmentation products as they emerge from said column.

6. In combination with a chromatograph system, apparatus adapted to volatilize a sample constituent comprising:

a housing structure having an elongated chamber defined therein and having an outlet opening connected with said chromatograph system;

an electrically nonconductive member mounted in said housing structure and defining at least a portion of said longitudinal chamber formed in said housing structure;

electrodes mounted in said nonconductive member and having a discharge gap therebetween within said chamber, said electrodes being adapted for connection across a source of high electrical voltage of sufficient intensity to create an electrical discharge across the gap between said electrodes;

a neck section protruding from said housing structure having a sample insert opening therein in alignment with said gap between said electrodes; and a longitudinal probe adapted to extend into said chamber through said insert opening in said neck section, said probe having a sample holder on the end thereof for placing a sample between said spaced-apart electrodes in said nonconductive member, said probe having an electrically and thermally nonconductive section disposed between said sample holder and the opposite end of said probe thermally and electrically isolating said sample holder so that a sample disposed between said electrodes in said nonconductive member may be volatilized and fragmented by said electrical discharge without dissipating any substantial amount of the energy of said discharge through said sample holder to said probe.

7. In combination with a chromatograph system, apparatus adapted to volatilize a sample constituent comprising:

a housing structure having an elongated chamber defined therein and having an outlet opening connected with said chromatograph system;

an electrically nonconductive member mounted in said housing structure and defining at least a portion of said longitudinal chamber formed in said housing structure;

electrodes mounted in said nonconductive member and having a discharge gap therebetween within said chamber, said electrodes being adapted for connection across a source of high electrical voltage of sufficient intensity to create an electrical discharge across the gap between said electrodes;

a neck section protruding from said housing structure having a sample insert opening therein in alignment with said gap between said electrodes;

a longitudinal proble adapted to be inserted into said chamber through said opening in said neck section, said probe having a sample holder on the end thereof for placing a sample between said spaced-apart electrodes in said nonconductive member, said probe having an electrically and thermally nonconductive section disposed between said sample holder and the opposite end of said probe for thermally and electrically isolating said sample holder so that a sample disposed between said electrodes in said nonconductive member may be volatilized and fragmented by said electrical discharge without dissipating any substantial amount of the energy of said discharge through said sample holder to said probe; and sealing means disposed in said neck section for providing a gas-tight seal around said probe when inserted into said insert opening.

8. In an apparatus for analysis and characterization of a multicomponent sample mixture, the combination comprising:

a first chromatograph apparatus including a first separation column system and a first detector means for separating and measuring the individual components of a sample mixture;

fragmentation means including a fragmentation chamber for fragmenting at least a portion of a sample into a plurality of individual fragmentation products, a second chromatographic column system and a second detector means connected in series circuit for the flow of a carrier gas stream therethrough, said fragmentation chamber including a pair of electrodes adapted to create an electrical discharge in said carrier stream; and component selector means connecting with the outlet of said detector of said first gas chromatograph apparatus for selectively inserting a particular component emerging from said first gas chromatograph apparatus into a carrier stream flowing through said fragmentation means so that said component is subjected to said electrical discharge and fragmented into a plurality of fragmentation products for separation in said second chromatographic column system of said fragmentation means and measured in said second detector means as they emerge from said second column system.

9. In an apparatus for analysis and characterization of a multicomponent sample mixture the combination comprising:

a first chromatograph apparatus including a first separation column system and a first detector means for separating and measuring the individual components of a sample mixture;

fragmentation means including a fragmentation chamber for fragmenting at least a portion of a sample into a plurality of individual fragmentation products, a second chromatograph column system and a second detector means connected in series circuit for the flow of a carrier gas stream therethrough, said fragmentation chamber including a pair of electrodes adapted to create an electrical discharge in said carrier stream;

means for introducing a reactive gas component into said electrical discharge within said fragmentation chamber; and component selector means connecting with the outlet of said first detector of said first gas chromatograph apparatus for selectively inserting a particular component emerging from said first chromatograph apparatus into said carrier stream flowing through said fragmentation means so that said component is subjected to said electrical discharge and fragmented into a plurality of fragmentation products for reaction with said reactive gas, said fragmentation products being separated in said second chromatograph column system of said fragmentation means and measured in said second detector means as they emerge from said second column system.

10. In an apparatus for analysis and characterization of a multicomponent sample mixture, the combination comprising:

a first chromatograph apparatus including a first separation column system and a first detector means for separating and measuring the individual components of a sample mixture;

fragmentation means including a fragmentation chamber for fragmenting at least a portion of a sample into a plurality of individual fragmentation products, a second chromatographic column system and a second detector means connected in series circuit for the flow of a carrier gas stream therethrough, said fragmentation chamber having a narrow constricted section therein through which all of the gas flowing through said chamber must pass and including electrode members disposed on opposite sides of said constricted section and connected across a high voltage source for creating an electrical discharge through said constricted section of said fragmentation chamber;

means for introducing a reactive gas component into said carrier gas stream at a point upstream from said fragmentation chamber; and component selector means connecting with the outlet of said detector of said first gas chromatograph apparatus for selectively inserting a particular component emerging from said first chromatograph apparatus into said carrier stream flowing through said fragmentation means so that said component is subjected to said electrical discharge in said constricted section and fragmented into a plurality of fragmentation products for reaction with said reactive gas component, said products of said sample being separated in said second chromatograph column system of said fragmentation means and measured in said second detector means as they emerge from said second column system.

11. An electrical discharge device for volatilizing and fragmenting a sample to be analyzed in a chromatograph system comprising:

an electrically nonconductive member defining an electrical discharge chamber having inlet and outlet openings for the flow of a carrier fluid;

means for introducing an organic sample into said discharge chamber; and spaced-apart electrode means mounted in said chamber, said electrodes being connected to a source of high electrical voltage of sufficient intensity to create an electrical glow discharge across the space between said electrodes for volatilizing and fragmenting said sample into a plurality of individual fragmentation products at least some of which retain characteristic structural features of the parent molecule of said sample.

12. An electrical discharge device for volatilizing and fragmenting a sample to be analyzed in a chromatograph system comprising:

an electrically nonconductive member defining a discharge chamber having inlet and outlet openings for the flow of a carrier fluid;

spaced-apart electrodes mounted in said chamber, said electrodes adapted for connection across a source of high electrical voltage of sufficient intensity to create an electrical discharge across the space between said electrodes;

a sample insert opening in said nonconductive member in alignment with the space between said electrodes;

a probe member having a sample holder attached to one end thereof, said probe member adapted to extend through said sample insert opening in alignment with the space between said electrodes for placing a sample into said electrical discharge between said electrodes; and means in said inlet opening for sealing around said probe member when inserted into said sample insert opening for preventing the flow of carrier fluid through said sample opening.

13. An electrical discharge device for volatilizing and fragmenting a sample to be analyzed in a chromatograph system comprising:

an electrically nonconductive member defining an electrical discharge chamber having inlet and outlet openings for the flow of a carrier fluid;

spaced-apart electrodes mounted in said chamber, said electrodes adapted for connection across a source of high electrical voltage of sufficient intensity to create an electrical discharge across the space between said electrodes;

means for introducing a sample into said electrical discharge for volatilizing and fragmenting said sample into a plurality of individual fragmentation products at least some of which retain characteristic structural features of the parent molecule of said sample; and means including an inlet opening communicating with said discharge chamber for introducing a reactive gas component into said chamber for stabilizing said electrical discharge.

14. An electrical discharge device for fragmenting a sample to be analyzed in a chromatograph system comprising:

an electrically nonconductive member defining an electrical discharge chamber having inlet and outlet openings for the flow of a carrier fluid, said member having a narrow constriction therein;

means for introducing a sample into said discharge chamber; and spaced-apart electrodes mounted in said chamber on opposite sides of said narrow constriction in said chamber and adapted to be connected to a source of high electrical voltage of sufficient intensity to create an electrical discharge through said narrow constriction within said chamber for volatilizing and fragmenting said sample into a plurality of individual fragmentation products at least some of which retain characteristic structural features of the parent molecule of said sample.

15. An electrical discharge device for fragmenting a sample to be analyzed in a gas chromatograph system comprising:

a tubular member having inlet and outlet openings for the flow of a carrier gas stream;

said tubular member defining an electrical discharge chamber and having a venturi-shaped constricted section therein through which all of said gas flowing through said chamber must pass;

means for introducing a gaseous sample into said carrier gas stream at a point upstream from said discharge chamber; and electrode members disposed on opposite sides of said venturi-shaped constricted section and adapted to be connected across a source of high electrical voltage of sufficient intensity to create an electrical discharge through said constricted section for fragmenting at least a portion of said sample into a plurality of individual volatile fragmentation products at least some of which retain characteristic structural features of the parent molecule of said sample.

16. An electrical discharge device for volatilizing and fragmenting a sample to be analyzed in a gas chromatograph system comprising:

a tubular member having inlet and outlet openings for the flow of a carrier gas stream;

said tubular member defining an electrical discharge chamber and having a venturi-shaped constricted section therein through which all of said carrier gas must flow;

means for introducing a gaseous sample into said carrier stream at a point upstream from said discharge chamber;

electrode members disposed on opposite sides of said venturi-shaped constricted section and adapted to be connected to a source of high electrical voltage of sufficient intensity to create an electrical discharge across said constricted section for fragmenting at least a portion of said sample into a plurality of individual volatile fragmentation products at least some of which retain characteristic structural features of the parent molecule of said sample; and means including an inlet opening communicating with said chamber for introducing a reactive component over said electrical discharge for stabilizing said electrical glow discharge and reacting with fragmentation products produced therein as said sample is subjected to said electrical glow discharge.

17. In an apparatus for characterization of a sample, the combination comprising:
   means forming a cavity having inlet and outlet openings;
   means for flowing a stream of carrier gas through said cavity;
   means for introducing a sample into said cavity;
   discharge means for creating an electrical discharge within said cavity for fragmenting at least a portion of said sample into a plurality of individual volatile fragmentation products at least some of which retain characteristic structural features of the parent molecule of said sample;
   means for introducing a flow of reactive gas components through said electrical discharge for stabilizing said electrical discharge and reacting with said fragmentation products produced therein as said sample is introduced into said electrical discharge;
   at least one chromatographic column for separating said fragmentation and reactive products produced in said electrical discharge;
   means for passing a stream of carrier gas through said column;
   injection valve means having a sample passage connecting at one end with said carrier stream from said electrical discharge and connecting at the other end with a vent for venting said carrier stream from said electrical discharge, said valve including means for connecting said sample passage into said stream of carrier gas flowing through said chromatograph column for sweeping said fragmentation products from said sample passage into said chromatograph column to separate said individual fragmentation and reactive products; and
   a detector for identifying and measuring individual fragmentation and reactive products as they emerge from said column.

18. In an apparatus for characterization of a sample, the combination comprising:
   a fragmentation and volatilization chamber;
   means for flowing a stream of carrier gas through said chamber;
   means for introducing a sample into said chamber;
   electrode means mounted in said chamber for creating an electrical discharge to fragment at least a portion of said sample into a plurality of individual volatile fragmentation products at least some of which retain characteristic structural features of the parent molecule of said sample;
   means for introducing a reactive gas component at a point upstream from said electrical discharge for stabilizing said electrical discharge and reacting with said individual volatile fragmentation products as said sample is introduced into said electrical discharge;
   at least one chromatograph column for separating said fragmentation and reactive products produced in said electrical discharge;
   means for passing a stream of carrier gas through said column;
   a sample injection valve for injecting volatile fragmentation products from said electrical discharge into said chromatograph column, said sample injection valve including a sample passage adapted to be connected into said carrier gas stream flowing from said fragmentation chamber and adapted for connection to a vent for discharging products flowing through said passage, said valve including means for connecting said sample passage into said stream of carrier gas to said chromatograph column for sweeping products from said passage into said chromatograph column for separating said individual fragmentation products; and
   a detector for identifying and measuring individual fragmentation products as they emerge from said column.

19. In an apparatus for the characterization of a sample by chemical analysis, the combination comprising:
   electrical glow discharge means for fragmenting at least a portion of an organic sample into a plurality of individual volatile fragmentation products at least some of which retain characteristic structural features of the parent molecule of said sample;
   chromatographic means for separating individual fragmentation products including detector means for detecting and measuring individual fragmentation products; and
   means interconnecting said discharge means and said chromatographic means for introducing said fragmentation products into said chromatographic means for separation and detection thereby.

References Cited
UNITED STATES PATENTS

| | | | |
|---|---|---|---|
| 1,376,180 | 4/1921 | Wickersham | 204—323 X |
| 3,065,060 | 11/1962 | Roehrig et al. | 23—253 |
| 3,185,550 | 5/1965 | Haack | 23—259 X |
| 3,188,180 | 6/1965 | Holler | 23—230 |

OTHER REFERENCES

Desty, D. H., Editor, Gas Chromatography, 1958, Butterworths Scientific Publications, London (1958), pp. 288–293.

Fribance, A. E.: Industrial Instrumentation Fundamentals, McGraw-Hill Book Company, New York (1962), p. 322.

MORRIS O. WOLK, *Primary Examiner.*

H. A. BIRENBAUM, *Assistant Examiner.*